United States Patent
Kwanka

(10) Patent No.: US 8,869,669 B2
(45) Date of Patent: Oct. 28, 2014

(54) BAND SAW BLADE HAVING NUB-LIKE PROTRUSIONS

(76) Inventor: Werner Kwanka, Augsburg (DE)

( * ) Notice: Subject to any disclaimer, the term of this patent is extended or adjusted under 35 U.S.C. 154(b) by 541 days.

(21) Appl. No.: 13/062,310

(22) PCT Filed: Aug. 26, 2009

(86) PCT No.: PCT/EP2009/006196
§ 371 (c)(1),
(2), (4) Date: Jun. 23, 2011

(87) PCT Pub. No.: WO2010/025869
PCT Pub. Date: Mar. 11, 2010

(65) Prior Publication Data
US 2011/0265627 A1    Nov. 3, 2011

(30) Foreign Application Priority Data

Sep. 4, 2008  (DE) .......................... 10 2008 045 733

(51) Int. Cl.
*B27B 33/00* (2006.01)
*B23D 61/02* (2006.01)
*B23D 61/12* (2006.01)

(52) U.S. Cl.
CPC ............ *B23D 61/021* (2013.01); *B23D 61/121* (2013.01)

USPC .............................................. 83/835; 83/697

(58) Field of Classification Search
USPC ................................................... 83/661–852
See application file for complete search history.

(56) References Cited

U.S. PATENT DOCUMENTS

| 820,969 | A | * | 5/1906 | Grelck | 83/851 |
|---|---|---|---|---|---|
| 2,714,317 | A | * | 8/1955 | Drake | 76/112 |
| 5,606,900 | A | * | 3/1997 | Stoddard | 83/846 |
| 5,868,058 | A | * | 2/1999 | Senegas | 83/846 |
| 6,167,792 | B1 | * | 1/2001 | Korb et al. | 83/835 |
| 6,276,248 | B1 | * | 8/2001 | Cranna | 83/848 |
| 6,834,573 | B1 | * | 12/2004 | Nakahara | 83/851 |
| 2002/0124707 | A1 | * | 9/2002 | Izard | 83/835 |

FOREIGN PATENT DOCUMENTS

| DE | 202005006613 | 7/2005 |
|---|---|---|
| EP | 1716956 | 11/2006 |
| FR | 2886194 | 12/2006 |
| JP | 3283572 B | 5/2002 |
| WO | 0240233 | 5/2002 |

* cited by examiner

*Primary Examiner* — Omar Flores Sanchez
(74) *Attorney, Agent, or Firm* — Belles Katz LLC

(57) ABSTRACT

The saw blade according to the invention comprises a plurality of teeth spaced apart from each other by chip spaces, wherein at least some chip spaces have pimple-shaped bulges.

21 Claims, 2 Drawing Sheets

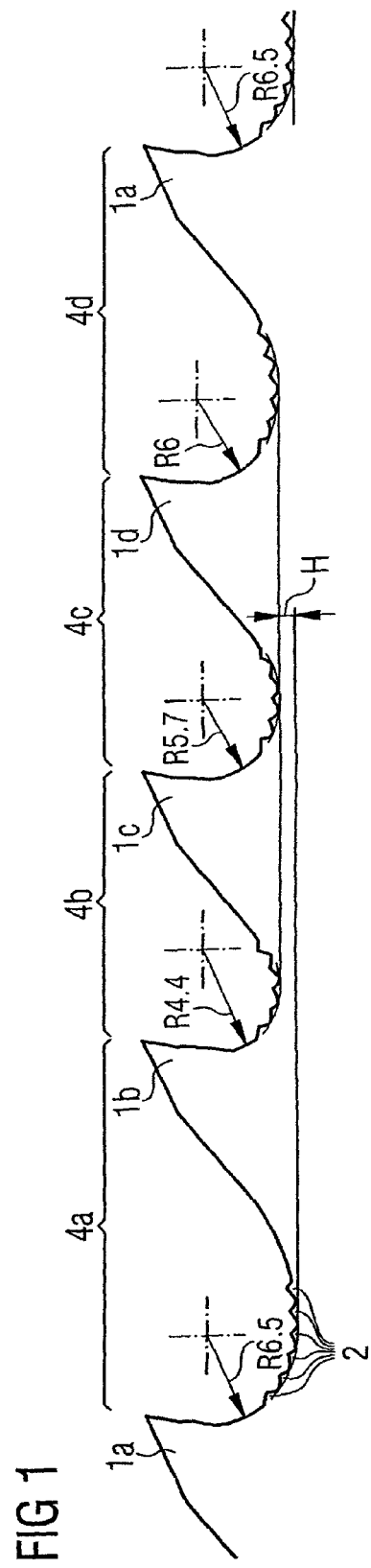

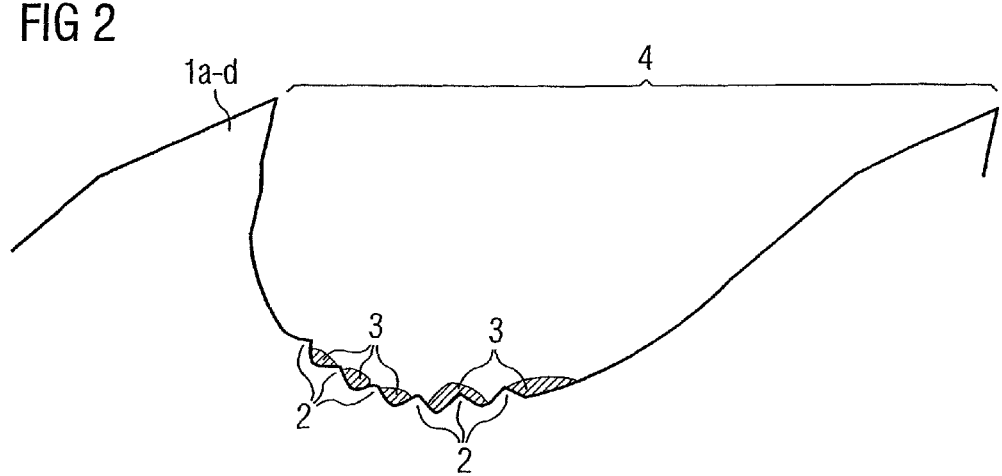
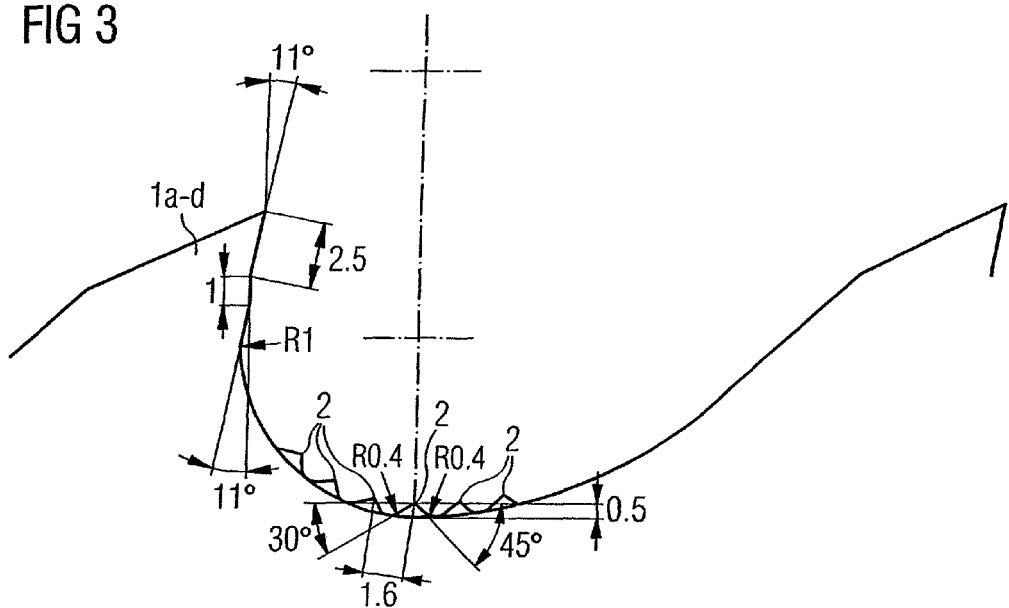

BAND SAW BLADE HAVING NUB-LIKE PROTRUSIONS

CROSS-REFERENCE TO RELATED PATENT APPLICATIONS

The present application is a U.S. national stage application under 35 U.S.C. §371 of PCT Application No. PCT/EP2009/006196, filed Aug. 26, 2009, which in turn claims priority to German Patent Application No. 10-2008-05733.7, filed Sep. 4, 2008, the entireties of which are incorporated herein by reference.

The subject matter of the instant invention is a band saw blade, with a plurality of teeth.

From prior art, band and circular saws for metal processing are known. Band and circular saws consist of a saw body having teeth milled out by means of a metal cutting method. It is also known from prior art to manufacture tooth tips of a hardened material, for instance, hard metal or HSS.

As a saw blade penetrates, deeper into metal material, the friction between the cutting channel and the sides of the saw blade increases. This friction results in the heating of the saw blade and in increased wear of the teeth. Furthermore, this heating may lead to a crystalline conversion process in the saw blade.

While the expanding of the saw blade may result in mechanical problems, for instance, the clamping of the saw blade in the cutting channel, the crystalline conversion of the saw blade would modify the mechanical properties of the saw blade and increase abrasion and signs of wear. Both effects result in an impair of the cutting performance and the cutting quality, especially with respect to the surface finish of the cut face.

In prior art it has been known for a long time to overcome this drawback with band saws at least partially by the selection of the geometry of the teeth and the arrangement thereof. It is therefore usual with band saws to arrange the teeth either in a straight-set manner, i.e. to deflect them alternately to the right and to the left, or to apply a corrugated contour on the saw blade. In the case of circular machine saw blades of high speed steel it is usual to provide them with hollow grinding or bulging or with inserted tooth segments or teeth of high speed steel or hard metal, respectively, so as to ensure the so-called free cut. In particular in the case of cut faces that require high precision, the cut quality depends substantially on the position of the teeth and on the lubrication and cooling agent management.

In this respect it has also been known for a long time to apply a lubricating and cooling agent, for instance, an emulsion of water and oils, into the cutting channel, said agent serving to remove the thermal accumulation produced in the cutting channel by friction as well as chips.

When dosing the lubricating and cooling agent it is important to achieve a balance between heat and chip removal and an optimized cutting temperature and contamination prevention of the sawing environment. It has therefore been a continuous effort for many years to reduce the consumption of lubricating and cooling agents without, however, decreasing the cutting performance and the cutting quality.

It is therefore an object of the instant invention to provide a saw blade geometry, in particular in the case of band saw blades, which enables to guarantee the cutting performance and the cutting quality with a simultaneous reduction of lubricating and cooling agent.

This object is solved by the saw blade in accordance with the invention with the features of claim 1.

Advantageous further developments of the instant invention are indicated in the subclaims.

The band saw blade according to the invention comprises a plurality of teeth spaced apart from each other by chip spaces, wherein at least some chip spaces have pimple-shaped bulges.

In accordance with the invention it is not necessary that such pimple-shaped bulges exist in each chip space. It is also advantageous to arrange the bulges according to the invention in every second chip space. It is likewise possible to position the bulges according to the invention in every third or fourth chip space.

In accordance with the invention, a pimple-shaped bulge is arranged at least in one chip space of the saw blade.

These pimple-shaped bulges may be arranged substantially regularly or else irregularly in the chip spaces and are expediently positioned in the proximity of the deepest point of the chip spaces. The pimple-shaped bulges are expediently shaped and arranged in the chip space such that the lubricating and cooling agent applied remains as long as possible, i.e. while the chip space is being in the cutting channel, therein, and hence a longer dwelling time of the lubricating and cooling agent on the saw blade is achieved.

By means of the contour change according to the invention in the chip space it is prevented that the lubricating and cooling agent quickly flows past the saw blade and the desired temperature removal is not performed optimally. Likewise, by means of the contour change according to the invention in the chip space it is achieved that the lubricating and cooling agent is adapted to better develop the lubricating function since the lubricating and cooling agent at the pimple-shaped bulges and in the intermediate spaces thereof produces a lubricating film in the cutting channel for a longer time.

Furthermore, the dwelling time of the cooling agent in the chip space is substantially increased by the saw blade according to the invention so as to also achieve a better and more efficient heat removal performance.

In accordance with the invention, the contour of the pimple-shaped bulges has to be chosen such that the progress of forces and the removal of chips in the saw blade is not obstructed during sawing and a possible tooth fracture is prevented. The pimple-shaped bulges have no chipping function.

In accordance with the invention, the pimple-shaped bulges may be designed like a comb, or may have a polygon contour. It is also possible that the pimple-shaped bulges have a spherical contour and/or are of different heights.

In accordance with the invention, the number of the pimple-shaped bulges as well as their arrangement and contour may made dependent on the tooth pitch and the tooth depth.

In a preferred embodiment of the instant invention, the pimple-shaped bulges are designed in a serrated manner with a steep and a flatly descending edge.

Advantageously, the cutting material is made of hard metal, HSS, or some other hard material.

In another embodiment of the instant invention, the teeth of the saw blade are coated with a hard material layer.

One embodiment of the present invention will be explained in more detail by means of Figures. There show:

FIG. 1 a side view of a saw blade according to the invention;

FIG. 2 a detailed view of a saw blade according to the invention with lubricating and cooling agent;

FIG. 3 a detailed view of a saw blade according to the invention pursuant to FIG. 2.

FIG. 1 shows a section of a side view of a saw blade in accordance with the invention comprising teeth 1a to 1d. The chip spaces 4a to 4d are positioned between the respective teeth 1a to 1d. In a region that is non-critical for the force and torque diagram of sawing, pimple-shaped bulges 2 are arranged in the chip spaces 4a to 4d. In accordance with FIG. 1, the chip space 4a is positioned on a level H that is lower vis-à-vis the chip spaces 4b to 4d. Likewise, the widths of the chip spaces 4a to 4d are designed differently. In accordance with the invention it is possible to design the pimple-shaped bulges 2 in the chip spaces 4a to 4d differently, i.e. to adapt the contour, the length, the height, and the number to technical demands. Thus, it may, for instance, be useful, for avoiding vibrancies, to vary the contour, the length, the height, and/or the number of the pimple-shaped bulges 2 from chip space to chip space.

FIG. 2 shows a detailed view of the saw blade in accordance with the invention, wherein the lubricating and cooling agent 3 adheres to the pimple-shaped bulges 2 as a film. In accordance with the invention, the pimple-shaped bulges 2 are designed and adapted to the surface tension of the lubricating and cooling agent such that a meniscus of lubricating and cooling agent may form between the individual pimple-shaped bulges 2. In this respect, the edge shape of the pimple-shaped bulges 2 as well as the height and the surface finish may be of importance.

In accordance with the invention, the pimple-shaped bulges are milled into the saw body. It is likewise possible to apply the pimple-shaped bulges into the saw body by eroding or grinding.

In accordance with the invention, the pimple-shaped bulges extend about the entire breadth of the saw blade and thus form straight channels (not illustrated) proceeding transversely to the saw blade, in which drops of cooling agent 3 accumulate due to their surface tension.

FIG. 3 shows a section of a preferred embodiment of the present invention with dimension indications for the pimple-shaped bulges 2 in accordance with the invention. According to FIG. 3, the pimple-shaped bulges have, for instance, a height of 0.5 mm and have a distance between adjacent peaks of 1.6 mm. The pitch angle opposite to the horizontal is approx. 45° in the direction of sawing and forms a steep edge, and 30° at the rear side and forms a flatly descending edge. It is advantageous to form a defined transition between the pimple-shaped bulges 2 and the basis of the chip space so as to optimally exploit the surface tension of the cooling agent. To this end, it is advantageous to choose the radius of curvature, for instance, in the magnitude of 0.4 mm. For the dimensioning of the radius of curvature of the vertical angle (not illustrated) it is recommended to choose a value between 0.2 mm and 0.8 mm.

The invention claimed is:

1. A metal cutting saw blade with a plurality of teeth, characterized in that a plurality of pimple-shaped bulges are arranged in at least one chip space formed between adjacent teeth, the pimple-shaped bulges being formed in a deepest portion of the at least one chip space and configured to retain a cooling-lubricating agent between adjacent pimple-shaped bulges.

2. The saw blade according to claim 1, further comprising a plurality of pimple-shaped bulges arranged substantially regularly in the chip space.

3. The saw blade according to claim 1, further comprising a plurality of pimple-shaped bulges arranged irregularly in the chip space.

4. The saw blade according to claim 2, wherein the pimple-shaped bulges are positioned in a vicinity of a deepest point of the chip space.

5. The saw blade according to claim 1, further comprising a plurality of pimple-shaped bulges designed in a comb-shaped manner.

6. The saw blade according claim 1, wherein the pimple-shaped bulge has a polygon contour.

7. The saw blade according to claim 1, wherein the pimple-shaped bulge has a spherical contour.

8. The saw blade according to claim 1, wherein at least one of a height and a number of pimple-shaped bulges in the chip spaces are different.

9. The saw blade according to claim 1, wherein both a number of the pimple-shaped bulges and an arrangement and contour thereof depend on tooth pitch and tooth depth.

10. The saw blade according to claim 1, further comprising a plurality of pimple-shaped bulges designed in a serrated manner with a steep and a flatly descending edge.

11. The saw blade according to claim 1, wherein the teeth are formed of hard metal, HSS, or some other hard material.

12. The saw blade according to claim 1, wherein the teeth of the saw blade are coated with a hard material layer.

13. A band saw or a circular saw with the saw blade according to claim 1.

14. The saw blade according to claim 3, wherein the pimple-shaped bulges are positioned in the vicinity of the deepest point of the chip space.

15. A metal cutting saw blade comprising:
   a plurality of spaced-apart teeth defining chip spaces between the teeth;
   a plurality of pimple-shaped bulges disposed in at least some of the chip spaces, the pimple-shaped bulges being positioned in a vicinity of a deepest portion in the at least some of the chip spaces;
   wherein the pimple-shaped bulges are arranged to form adjoining peaks and valleys configured to retain a cooling-lubricating agent in the valleys for metal cutting.

16. The saw blade according to claim 15, wherein at least chip space is positioned at a level that is lower than an adjacent chip space.

17. The saw blade according to claim 15, wherein at least one chip space has a width that is different than an adjacent chip space.

18. The saw blade according to claim 15, wherein the pimple-shaped bulges are arranged in a contiguous comb-shaped manner.

19. The saw blade according claim 15, wherein each of the pimple-shaped bulges have a polygon contour formed of opposing straight sides intersecting at an angled sharp peak.

20. A metal cutting saw blade comprising:
   a plurality of spaced-apart teeth terming points and defining chip spaces between the teeth;
   a plurality of polygonal pyramidal-shaped bulges forming an array disposed in each of the chip spaces, the array of pyramidal-shaped bulges each being positioned at a deepest portion of the chip spaces below the points of the teeth;
   wherein the pyramidal-shaped bulges are arranged to form adjoining peaks and the valleys configured to retain a cooling-lubricating agent in the valleys for metal cutting.

21. The saw blade according to claim 19, wherein the pyramidal-shaped bulges each have a side in a sawing direction with a pitch angle that is different than a pitch angle on an opposing rear side.

* * * * *